United States Patent
Ludtke et al.

(10) Patent No.: US 6,434,596 B1
(45) Date of Patent: Aug. 13, 2002

(54) METHOD AND SYSTEM FOR DISTRIBUTED QUEUES IN A MULTIMEDIA NETWORK WITH PROXIES

(75) Inventors: Harold Aaron Ludtke, San Jose; Michael W. Blasgen, Los Gatos, both of CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 0 days.

(21) Appl. No.: 09/239,819

(22) Filed: Jan. 29, 1999

(51) Int. Cl.[7] .............................................. G06F 15/16
(52) U.S. Cl. ..................... 709/202; 709/203; 709/213; 709/217; 709/229; 707/104
(58) Field of Search ................................. 709/105–106, 709/200–203, 213, 217–219, 227–229, 238, 246; 707/2, 10, 104

(56) References Cited

U.S. PATENT DOCUMENTS

| | | | |
|---|---|---|---|
| 4,633,387 A | * 12/1986 | Hartung et al. | 709/105 |
| 5,778,356 A | * 7/1998 | Heiny | 707/104 |
| 5,848,234 A | * 12/1998 | Chernick et al. | 709/203 |
| 5,903,877 A | * 5/1999 | Berkowitz et al. | 705/26 |
| 5,918,013 A | * 6/1999 | Mighdoll et al. | 709/217 |
| 6,012,083 A | * 1/2000 | Savitzky et al. | 709/202 |
| 6,070,184 A | * 5/2000 | Bloant et al. | 709/200 |
| 6,182,111 B1 | * 1/2001 | Inohara et al. | 709/201 |
| 6,209,018 B1 | * 3/2001 | Ben-Shacher et al. | 709/105 |

FOREIGN PATENT DOCUMENTS

| | | |
|---|---|---|
| EP | 0 600 235 A1 | 6/1994 |
| JP | 10312351 | 11/1998 |
| WO | 98/31121 | 7/1998 |

* cited by examiner

Primary Examiner—Bharat Barot
(74) Attorney, Agent, or Firm—Finnegan, Henderson, Farabow, Garrett & Dunner, L.L.P.

(57) ABSTRACT

Methods and systems consistent with the present invention perform services in a multimedia network, for example an audio/video (AV) network, by storing in a proxy device a plurality of requests and the associated data for performing services. The proxy device receives via a serial interface from requesting devices in the AV network a plurality of requests for performing the services. When the proxy device detects that the requesting devices or other devices that provide the data associated with the stored requests are on-line, the proxy device retrieves the associated data from these devices. When the proxy device detects that the servicing devices are on-line, the proxy device transfers the requests and the associated data to the servicing devices. The servicing devices then perform the services associated with the requests, and return one or more results associated with the services to the proxy device. When the proxy device detects that the requesting devices or other devices that must receive the results are on-line, the proxy device sends the results to those devices.

23 Claims, 5 Drawing Sheets

METHOD AND SYSTEM FOR DISTRIBUTED QUEUES IN A MULTIMEDIA NETWORK WITH PROXIES

CROSS-REFERENCE TO RELATED APPLICATIONS

This application is related to U.S. application Ser. No. 09/239,696, filed Jan. 29, 1999, entitled "Method And System For Distributed Queues In A Multimedia Network," and filed concurrently herewith, the contents of which are incorporated herein by reference.

TECHNICAL FIELD

The present invention relates generally to multimedia networks, and more particularly, to a method and system for distributed queues in a multimedia network with proxies.

BACKGROUND OF THE ART

With advancements in digital bus technologies, a variety of consumer electronic and computing devices can be integrated to form a multimedia network, for example, an audio/video (AV) network. One such bus standard is the Institute of Electrical and Electronics Engineers 1394 (IEEE 1394) digital interface standard, which enables high speed data communication between consumer electronic devices such as, video camcorders, electronic still cameras, computers, and digital audio and video equipment.

Furthermore, higher layer communication protocols, such as International Electrotechnical Commission 61883 (IEC 61883), Audio Video Control (AV/C), and Home Audio/Video interoperability (HAVi),standards, allow complex communication between consumer electronic devices. By taking advantage of these higher layer protocols and the IEEE 1394 bus standard, consumer electronic devices are becoming more integrated.

As these devices become integrated and perform more complex tasks, sharing of data between the devices becomes more important. Some devices in an AV network may perform data "capturing" services, such as capturing digital still images, while other devices may perform specialized data "processing" services, such as printing or displaying the captured images. To integrate the data capturing with the data processing services, however, the devices in the AV network must somehow share the captured data.

As an illustration, consider an AV network that includes an IEEE 1394 bus connecting a plurality of video cameras to a printer. Each video camera in the AV network performs a data capturing service when. the video camera captures digital still images. The printer, on the other hand, performs a data processing service when the printer prints the captured images. To print the captured images, each video camera sends to the printer one or more requests, which may include one or more associated images. Since each request may include several associated images, and the printer may receive concurrent requests from a number of video cameras, the printer must have sufficient storage or memory resources to receive and store the requests and their associated images.

Most consumer electronic devices, however, have insufficient storage or memory resources to process such requests from a plurality of devices in an AV network because of the significant amount of data associated with the requests. To address the problem of limited storage and memory resources, U.S. application Ser. No. 09/239,696, filed Jan. 29, 1999, entitled "Method And System For Distributed Queues In A Multimedia Network," and filed concurrently herewith, described methods and systems for performing services in a multimedia network. These methods and systems queue in servicing devices a plurality of requests without the associated data and retrieve the associated data from one or more requesting devices only when a servicing device is ready to perform a service associated with a queued request.

These methods and systems, however, cannot establish requests for services while one or more servicing devices in the AV network are off-line. A servicing device may go off-line, for example, when a user temporarily removes or disconnects the servicing device from the AV network or when the user presses a pause button on the servicing device to temporarily halt processing in the servicing device. While the servicing device is off-line, requesting devices and other devices in the AV network must continue to store their requests and the associated data until the servicing device goes on-line again.

Furthermore, when a servicing device queues a request from a requesting device, the requesting device and other devices that provide the associated data must remain on-line until the servicing device serves the queued request. Moreover, since the servicing device retrieves the associated data from these devices only when the servicing device is ready to serve the queued request, depending on the number of queued requests, these devices may store the associated data for a significant period of time, and thus during that period, cannot use their limited memory and storage resources for performing other tasks. Finally, a user may wish to remove or disconnect a requesting device from the AV network after the requesting device sends a request to a servicing device but before the servicing device retrieves the associated data from the requesting device.

Therefore, it is desirable to have a method and system for performing services in a multimedia network with proxies that overcome the above and other disadvantages of the prior art.

DISCLOSURE OF THE INVENTION

Methods and systems consistent with the present invention perform services in a multimedia network, for example an audio/video (AV) network, by storing in a proxy device a plurality of requests for performing the services when one or more devices in the AV network are off-line. The proxy device may then retrieve the data associated with the stored requests from one or more devices in the AV network that provide the associated data. The associated data may include any type of digitized information, for example, text, audio, video, and graphics.

A service is broadly defined herein to include any processing performed by a servicing device using the associated data, for example, printing the associated data, displaying the associated data on a digital monitor, adding sound effects to the associated data, or adding visual effects or animation to the associated data, etc.

In accordance with an embodiment of the invention, the proxy device receives via a serial interface from requesting devices in the AV network a plurality of requests for performing services, for example printing digitally captured images, and stores the requests. When the requesting devices or other devices (hereinafter referred to as "data providing devices") that provide the data associated with the stored requests are on-line, the proxy device retrieves the associated data from these devices and stores the associated data. Alternatively, the proxy device may not retrieve the associated data from the requesting devices or the data providing devices until one or more servicing devices request the associated data and the proxy device detects that the requesting devices and the data providing devices are on-line.

When the proxy device detects that one or more servicing devices in the AV network are on-line, the proxy device transfers the stored requests and the associated data to the servicing devices. The servicing devices then perform the services associated with the requests, for example, print the captured images, and return one or more results associated with the services to the proxy device. When the proxy device detects that the requesting devices or other devices that must receive the results are on-line, the proxy device sends the results to those devices.

The proxy device may include any computing device that includes a serial interface, which complies with a serial interface standard for networking consumer electronic devices, for example, IEEE 1394 standard. The requesting and servicing devices may include any consumer electronics or computing devices, for example digital video cameras, personal computers (PCs), digital video monitors, audio actuators, and video actuators that include a serial interface, which complies with a serial interface standard for networking consumer electronic devices, for example, IEEE 1394 standard.

Methods and systems consistent with the present invention have several advantages over the prior art. First, requesting devices in a multimedia network can transparently offload requests and the associated data to a proxy device when a servicing device is off-line, thereby allowing the requesting devices to perform other tasks. Second, requesting devices can establish a number of requests without requiring expensive memory and storage resources. Third, requesting devices and other devices that store the data associated with requests can temporarily go off-line without disrupting the ability of servicing devices to perform the associated services. Fourth, requesting devices and other devices that store the associated data do not have to store the data for a significant period of time, thereby making their limited storage and memory resources available for other tasks. Finally, users can remove or disconnect from the AV network a requesting device and other devices that store the associated data after the requesting device sends a request to a servicing device but before the servicing device retrieves the associated data from the proxy device.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BEST MODE FOR CARRYING OUT THE INVENTION

Reference will now be made in detail to the preferred embodiments of the invention, examples of which are illustrated in the accompanying drawings. wherever possible, the same reference numbers will be used throughout the drawings to refer to the same or like parts.

In accordance with methods and systems consistent with the present invention, a proxy device in a multimedia network, for example, an audio/video (AV) network, receives via a serial interface from requesting devices in the AV network a plurality of requests for performing services. When the requesting devices or other data providing devices that provide the data associated with the stored requests are on-line, the proxy device retrieves the associated data from these devices and stores the associated data. Alternatively, the proxy device may not retrieve the associated data from the requesting devices or the data providing devices until one or more servicing devices request the associated data and the proxy device detects that the requesting devices and the data providing devices are on-line.

The data associated with the requests may include any type of digitized information, for example, text, audio, video, and graphics. The services may include any processing performed by servicing devices using the associated data, for example, printing the associated data, displaying the associated data on a digital monitor, adding sound effects to the associated data, or adding visual effects or animation to the associated data, etc.

When the proxy device detects that the servicing devices are on-line, the proxy device transfers the requests and the associated data to the servicing devices. The servicing devices then perform the services associated with the requests, and return one or more results associated with the services to the proxy device. When the proxy device detects that the requesting devices or other devices that must receive the results are on-line, the proxy device sends the results to those devices.

Figure 1:
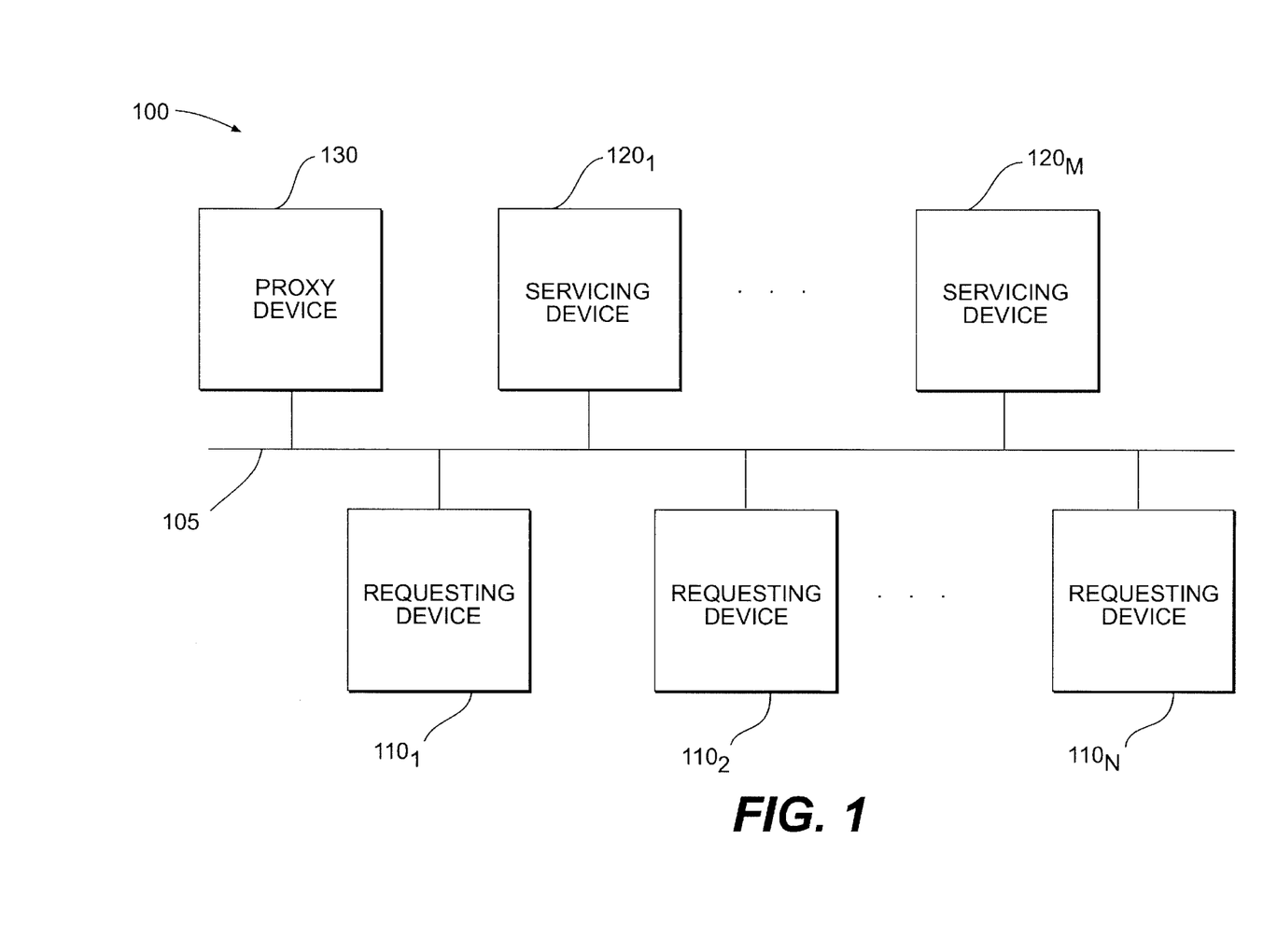
FIG. 1 is a block diagram of a multimedia network, in accordance with an embodiment of the present invention.

FIG. 1 is a block diagram of a multimedia network 100, in accordance with an embodiment of the present invention. In one embodiment, multimedia network 100 comprises an IEEE 1394 bus 105, which interconnects N requesting devices $110_1$–$110_N$, M servicing devices, and a proxy device 130. Alternatively, in another embodiment, multimedia network 100 may comprise a wireless serial interface for enabling communication between requesting devices $110_1$–$110_N$, servicing devices $120_1$–$120_M$, and proxy device 130.

In the embodiment of FIG. 1, bus 105 may, for example, be a high speed serial bus, which enables communication between requesting devices $110_1$–$110_N$, servicing devices $120_1$–$120_M$, and proxy device 130 at speeds of 1 Mbits/sec or greater, for example, 10, 100, or 400 Mbits/sec. Alternatively, bus 105 may, for example, be a low speed bus, which enables communication between requesting devices $110_1$–$110_N$, servicing devices $120_1$–$120_M$, and proxy device 130 at speeds of less than 1 Mbit/sec, for example, 1, 10, or 100 Kbits/sec.

Requesting devices $110_1$–$110_N$, may each include, for example, a digital video camera, digital video cassette recorder (VCR), digital still image camera, personal computer (PC), or any other consumer electronics device that includes a serial interface, which complies with a serial interface standard for networking consumer electronic devices, for example, IEEE 1394 standard.

Servicing devices may each include, for example a printer, digital monitor, digital speakers, PC, audio actuator, voice actuator, or any other consumer electronics device that includes a serial interface, which complies with a serial interface standard for networking consumer electronics devices, for example, IEEE 1394 standard. Furthermore, servicing devices $120_1$–$120_M$ are preferably capable of performing the methods described in the above identified U.S. application Ser. No. 09/239,696, filed Jan. 29, 1999, entitled "Method And System For Distributed Queues In A Multimedia Network," and filed concurrently herewith.

Proxy device 130 may include, for example, any computing device that includes a serial interface and is capable of performing the methods described herein.

Figure 2:
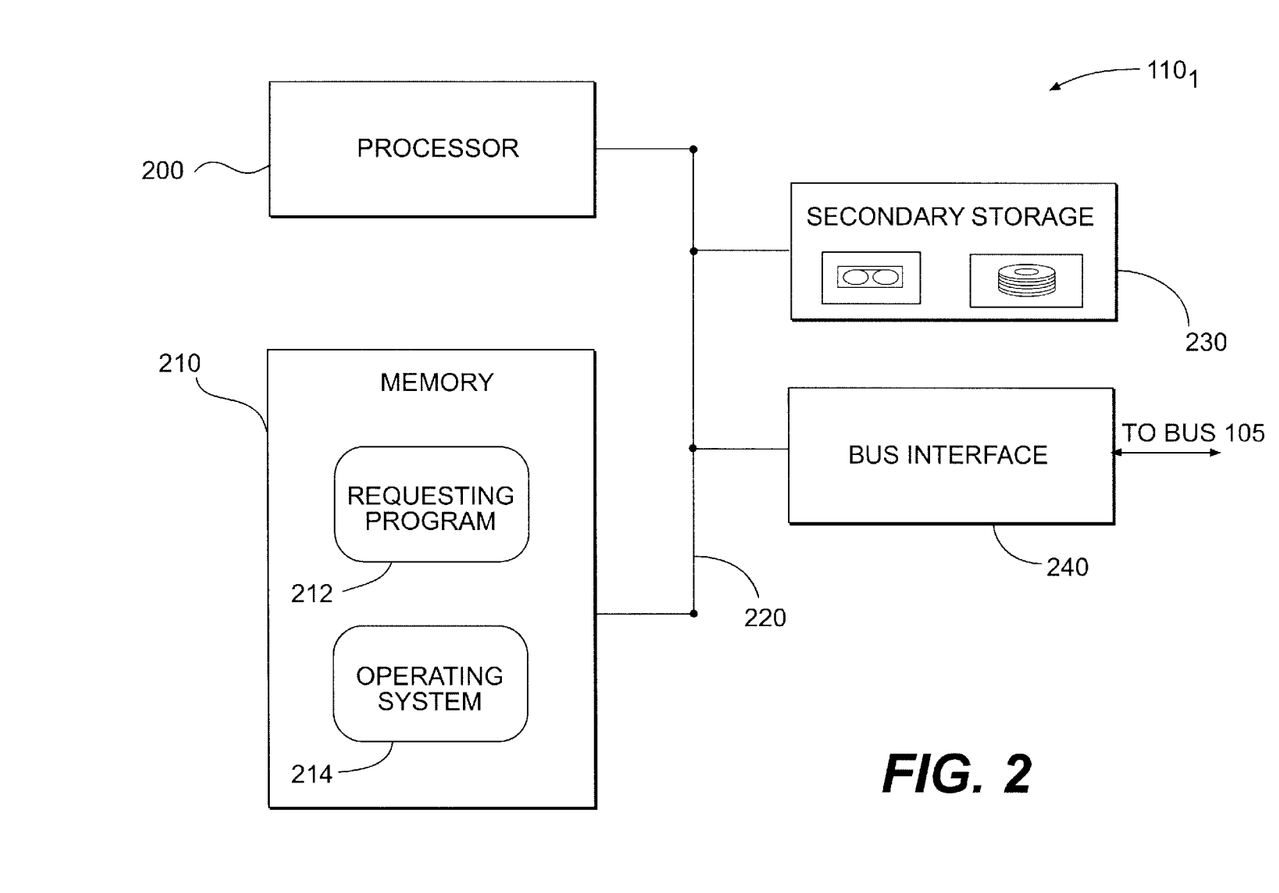
FIG. 2 is a block diagram of a requesting device, in accordance with an embodiment of the present invention.

FIG. 2 is a block diagram of a requesting device, for example requesting device $110_1$, in accordance with an embodiment of the invention. Requesting device $110_1$ comprises a processor 200, which connects via a bus 220 to a memory 210, a secondary storage 230, and a bus interface unit 240.

Memory 210 comprises a requesting program 212 and an operating system 214, each of which includes instructions in the form of software or firmware executed by processor 200.

Secondary storage 230 may include, for example, a hard disk drive, a digital versatile disc (DVD), compact disc-read only memory (CD-ROM), or a video cassette.

Bus interface unit 240, which connects to bus 105, may comprise hardware and software or firmware for sending and receiving data on bus 105 using, for example, International Electrotechnical Commission 61883 (IEC 61883), Audio Video Control (AV/C), and/or Home Audio/Video interoperability (HAVi) protocols.

Figure 3:
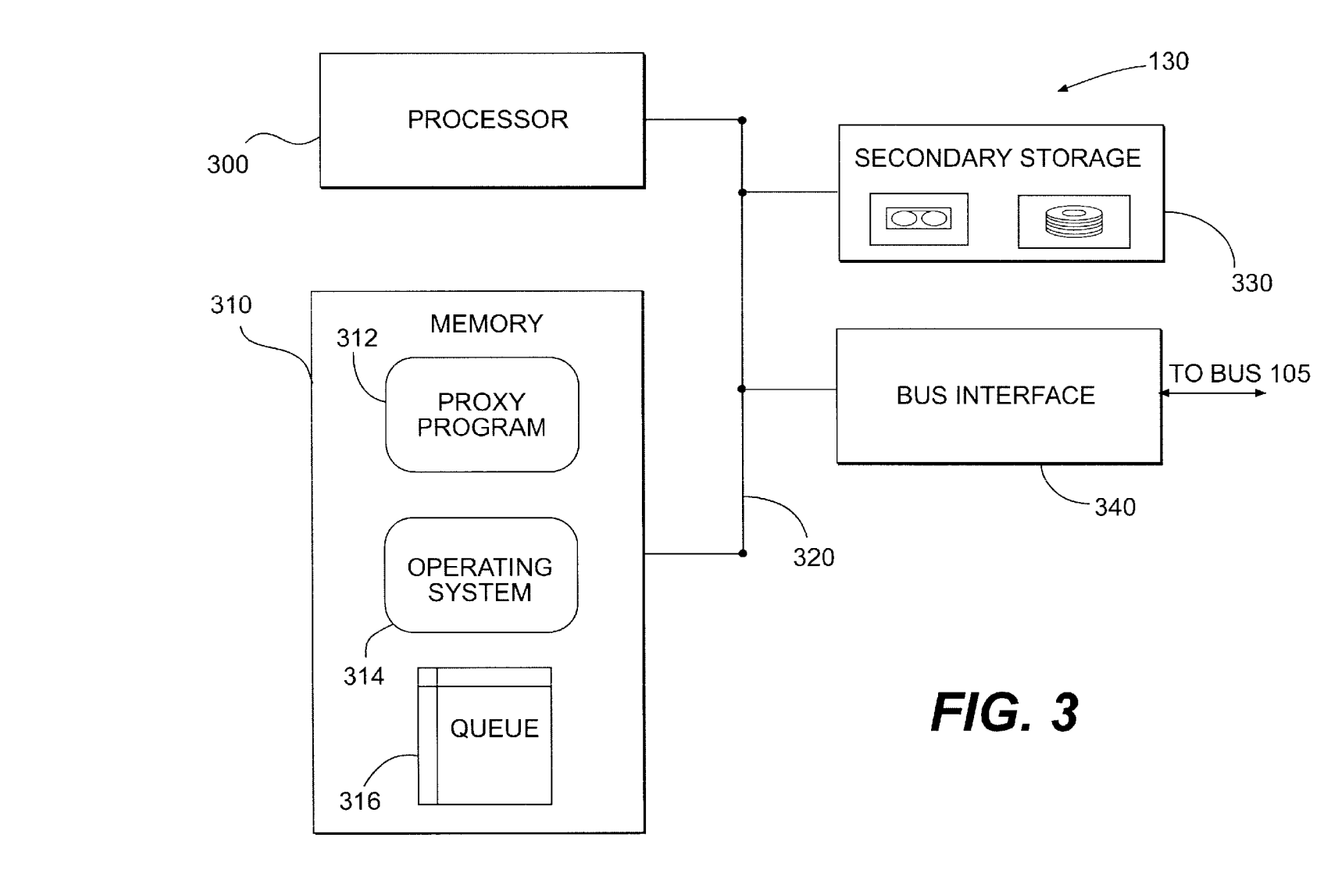
FIG. 3 is a block diagram of a proxy device, in accordance with an embodiment of the present invention.

FIG. 3 is a block diagram of proxy device 130, in accordance with an embodiment of the present invention. Proxy device 130 comprises a processor 300, which connects via a bus 320 to a memory 310, a secondary storage 330, and a bus interface unit 340.

Memory 310 comprises a proxy program 312, an operating system 314, and queue 316 or alternatively a plurality of queues (not shown). Proxy program 312 and operating system 314 include instructions in the form of software or firmware, which processor 300 executes.

Proxy program 312 stores the requests received from requesting devices $110_1$–$110_N$ in queue 316. Queue 316 may, for example, be implemented as a linked list or an array of request structures, where each request structure is associated with a particular request. Queue 316 includes an associated status structure, which includes, for example, real-time information about queue 316 and the request that proxy program 312 is currently processing.

Secondary storage 330 may include, for example, a digital versatile disc (DVD), compact disc-read only memory (CD-ROM), or a video cassette.

Bus interface unit 340, which connects to bus 105, may comprise hardware and software or firmware for sending and receiving data on bus 105 using, for example, IEC 61883, AV/C, and/or HAVi protocols.

Figure 4:
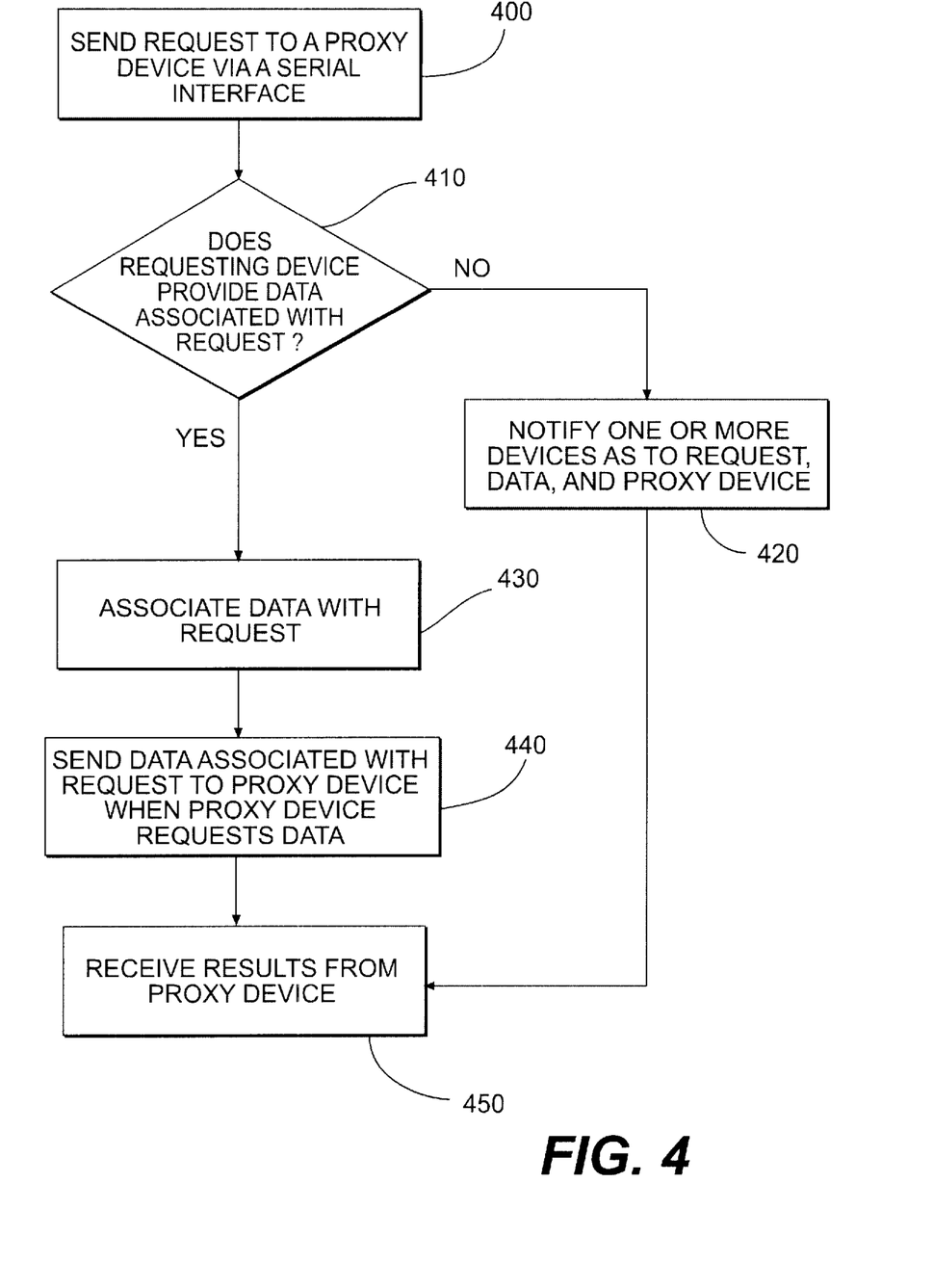
FIG. 4 is a flow chart of a process performed by a requesting program in a requesting device, in accordance with an embodiment of the present invention.

FIG. 4 is a flow chart of the process performed by requesting program 212 in requesting device $110_1$, in accordance with an embodiment of the present invention. Receiving program 212 sends proxy device 130 a request without the associated data items for performing a service, which servicing device $120_1$ must perform (stage 400). The associated data items may include any type of digitized information, for example, text, audio, video, and graphics.

The requested service may include, for example, printing the data items, displaying the data items on a digital monitor, adding sound effects to the data items, or adding visual effects or animation to the data items, etc.

Receiving program 212 may, for example, send proxy device 130 a Post Request command, which includes as its input parameters a request descriptor, a request identifier, and a request parameter and as its output parameter a queue identifier. The request descriptor may identify a particular service, for example printing one or more data items, which must be performed by servicing device $120_1$. The request identifier may include, for example, an alphanumeric string, which uniquely identifies the request.

The request parameter may be a structure, which includes the global unique identifier of servicing device $120_1$, the global unique identifiers associated with requesting devices $110_1$–$110_N$ that provides the data items associated with the request, the global unique identifiers of requesting devices $101_1$–$110_N$ to which servicing device $120_1$ must send one or more results associated with the service, the number of associated data items, and a priority assigned by requesting program 212. In addition, the request parameter may also include a description of the request in, for example, ASCII format.

In response to the Post Request command, proxy device 130 returns to requesting device $110_1$ the output parameter queue identifier, which uniquely identifies queue 316 in proxy device 130.

Requesting program 212 determines whether requesting device $110_1$ provides the data items associated with the request (stage 410). Requesting device $110_1$ may, for example, include the associated data items or retrieve the associated data items from other devices in multimedia network 100 or from a user.

If requesting device $110_1$ does not provide the associated data items, requesting program 212 identifies one or more of the requesting devices $110_2$–$110_N$ that provide the associated data items, and notifies the identified requesting devices $110_2$–$110_N$ as to the request identifier, the associated data items, and the global unique identifier of proxy device 30 (stage 420).

For example, requesting program 212 may send to each identified requesting device $110_2$–$110_N$ a Prepare Data command, which includes as its input parameters the request identifier, associated data item identifiers, and the global unique identifier of proxy device 130. The identified requesting devices $110_2$–$110_N$ then prepare to send proxy device 130 the associated data items when proxy device 130 requests the data items.

If requesting device $110_1$ provides the associated data items, requesting program 212 associates the data items with the request identifier (stage 430). When proxy device 130 requests the associated data item from requesting device $110_1$, requesting program 212 sends the associated data items to proxy device 130 (step 440). After servicing device $120_1$ performs the service associated with the request, requesting program 212 receives one or more results associated with the request from proxy device 130 (step 450).

Figure 5:
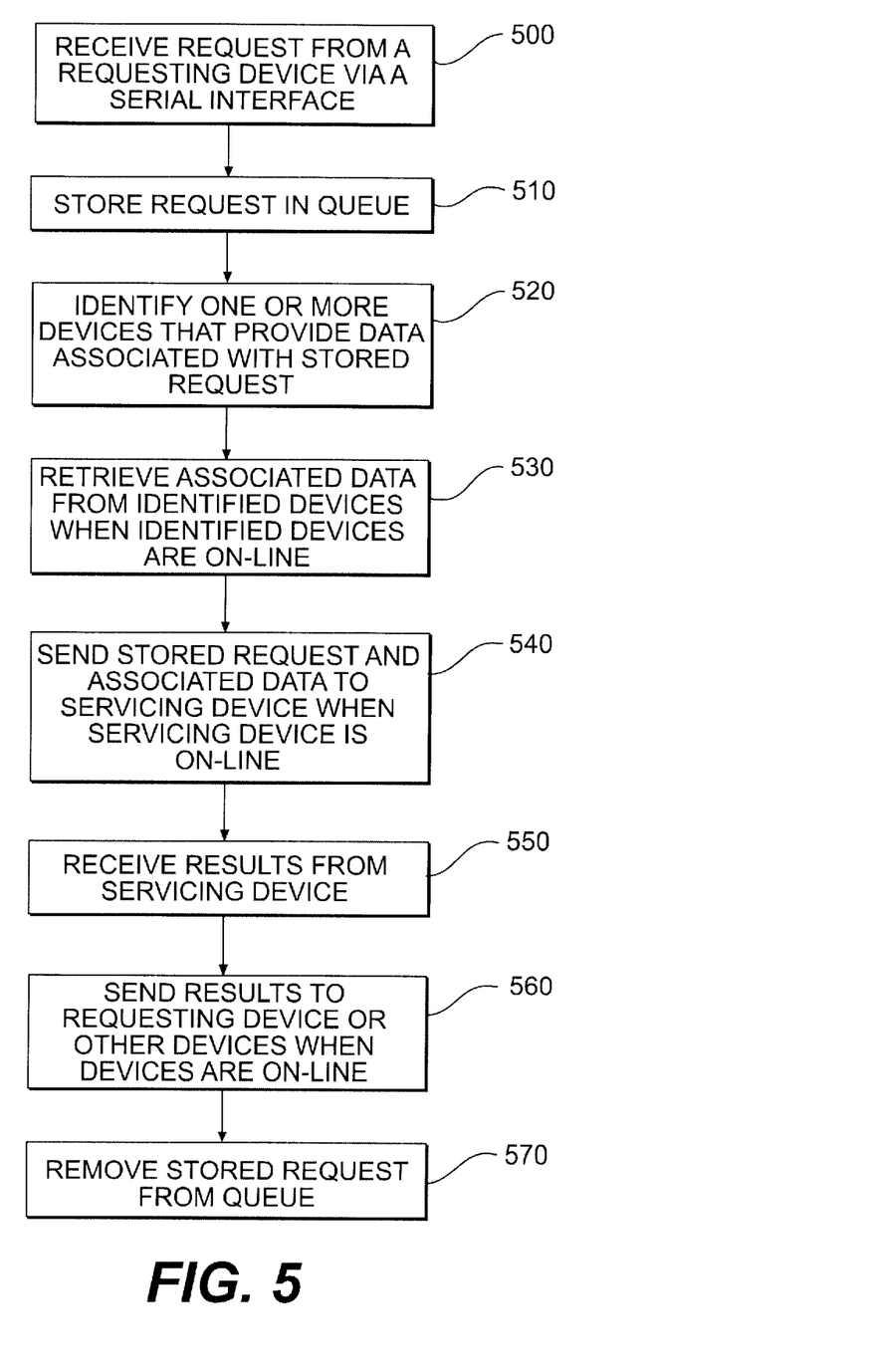
FIG. 5 is a flow chart of a process performed by a proxy program in a proxy device, in accordance with an embodiment of the present invention.

FIG. 5 is a flow chart of the process performed by proxy program 312 in proxy device 130, in accordance with an embodiment of the invention. Proxy device 130 receives a request, for example a Post Request command, from requesting device $110_1$ (stage 500). The request descriptor in the Post Request command identifies a particular service, for example printing one or more data items, displaying the data items on a digital monitor, adding sound effects to the data items, or adding visual effects or animation to the data items, which servicing device $120_1$ must perform.

Proxy program 312 then stores the received request in queue 316 (stage 510). For example, proxy program 312 may create a request structure and stores the request structure in queue 316. Proxy program 312 may include in the request structure, for example, the global unique identifier of servicing device $120_1$, the request identifier associated with the request, the request descriptor, the global unique identifier of requesting device $110_1$, the global unique identifier of requesting devices $110_1$–$110_N$ that include the data items associated with the request, and the global unique identifier of requesting devices $110_1$–$110_N$ to which proxy program 312 must send the results associated with the service. In addition, proxy program 312 may also include in the request structure the number of data items and the priority associated with the request.

Proxy program 312 then identifies the requesting devices $110_1$–$110_N$ that provide the associated data items (stage 520). When the identified requesting devices $110_1$–$110_N$ are on-line, proxy program 312 retrieves the associated data items from the identified requesting devices $110_1$–$110_N$ and stores the associated data items in, for example, secondary storage 330 (stage 530). Alternatively, proxy program 312 may not retrieve the associated data items from the identified requesting devices $110_1$–$110_N$ until servicing device $120_1$ requests the associated data items from proxy device 130 and proxy program 312 detects that the identified requesting devices $110_1$–$110_N$ are on-line.

To retrieve the associated data items, proxy program 312 may send to each identified requesting device $110_1$–$110_N$ for example, a Fetch Request Data command, which includes as its input parameters the global unique identifier associated with requesting device $110_1$, the request identifier associated with the selected request, and a connection identifier. In response to the Fetch Request Data command, each identified requesting device $110_1$–$110_N$ establishes, for example, an asynchronous or isochronous connection with proxy device 130, and sends the associated data items to proxy device 130.

When the connection between proxy device 130 and an identified requesting device $110_1$–$110_N$ is asynchronous, the connection identifier may identify, for example, an asynchronous connection plug associated with proxy device 130. Alternatively, when the connection is isochronous, the connection identifier may identify, for example, an isochronous channel allocated by proxy program 312.

In the case of an asynchronous connection, after an identified requesting device $110_1$–$110_N$ sends the associated data items in response to a Fetch Data Request command, the identified requesting device $110_1$–$110_N$ includes in its last data transfer, for example, an end-of-frame indicator to signal the end of the data transfer.

In the case of an isochronous connection, after an identified requesting device $110_1$–$110_N$ sends the associated data items in response to a Fetch Data Request command, the identified requesting device $110_1$–$110_N$ sends, for example, an End Of Request command to proxy device 130 to signal the end of the data transfer. The End Of Request command includes as its input parameters, for example, a queue identifier associated with a queue in servicing device $120_1$ and the request identifier associated with the request.

After retrieving the associated data items, when proxy program 312 detects that servicing device $120_1$ using methods and systems described in the above identified U.S. application Ser. No. 09/239,696, filed Jan. 29, 1999, entitled "Method And System For Distributed Queues In A Multimedia Network" (stage 540). For example, proxy program 312 may send servicing device $120_1$ a Post Request command, which includes as its input parameters the request descriptor, the request identifier, and a new request parameter and as its output parameter a queue identifier.

The new request parameter may include the global unique identifier of proxy device 130, which identifies proxy device 130 as the device that includes the associated data items, the global unique identifier of proxy device 130 as the device to which servicing device $120_1$ must send the results associated with the service, the number of associated results, and the priority assigned by requesting device $110_1$. In addition, the new request parameter may also include a description of the request in, for example, ASCII format.

In response to the Post Request command, servicing device $120_1$ returns to proxy device 130 the output parameter queue identifier, which uniquely identifies in servicing device $120_1$ a queue that stores the request.

When servicing device $120_1$ processes the request received from proxy device 130, servicing device $120_1$ sends proxy device 130 a Fetch Request Data command, which includes as its input parameters the global unique identifier associated with proxy device 130, the request identifier associated with the request, and a connection identifier. In response to the Fetch Request Data command, proxy device 130 establishes, for example, an asynchronous or isochronous connection with servicing device $120_1$, and sends the associated data items stored therein to servicing device $120_1$.

After receiving the associated data items, servicing device $120_1$ performs the service associated with the request, for example prints the data items, displays the data items on a digital monitor, adds sound effects to the data items, or adding visual effects or animation to the data items. Servicing device $120_1$ then sends one or more results associated with the service to proxy device 130.

When proxy device 130 receives the associated results (step 550), from the request structure stored in queue 316, proxy program 312 identifies requesting devices $110_1$–$110_N$ to which proxy program 312 must send the associated results. Proxy program 312 then sends the associated results to the identified requesting devices $110_1$–$110_N$ when proxy program 312 detects that the identified requesting devices $110_1$–$110_N$ are on-line (step 560). After sending the results, proxy program 312 deletes the request from queue 316 and the associated data from secondary storage 330 (stage 570).

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A method for performing services in a multimedia network including a first device, a second device, and a proxy device, said method comprising the steps of:

receiving, at the proxy device, a request for service from the first device via a serial interface;

storing the received request for service in a queue at the proxy device;

retrieving from the first device data associated with the stored request for service when the second device requests the data and the first device provides the data; and sending the stored request for service and the retrieved associated data to the second device when the second device is on-line.

2. The method of claim 1, further comprising the step of:

notifying, at the first device, a third device in the multimedia network as to the stored request for service, the data, and the proxy device when the third device provides the data.

3. The method of claim 1, further comprising the step of:

retrieving the data from a third device in the multimedia network when the third device provides the data.

4. The method of claim 1, further comprising the step of:

receiving, at the second device, the stored request for service and retrieved associated data from the proxy device when the second device is on-line; and performing a service associated with the received request for service.

5. The method of claim 4, further comprising the step of:

sending one or more results associated with the performed service to the proxy device.

6. The method of claim 4, further comprising the step of:

receiving, at the proxy device, one or more results associated with the performed service from the second device.

7. The method of claim 6, further comprising the step of:

sending the received results to the first device when the stored request for service identifies the first device for receiving the results and the first device is on-line.

8. The method of claim 6, further comprising the step of:

sending the received results to a third device in the multimedia network when the stored request for service identifies the third device for receiving the results and the third device is on-line.

9. The method of claim 4, further comprising the step of:

receiving, at the proxy device, one or more results associated with the performed service from the second device when the first device is off-line.

10. The method of claim 1, further comprising the step of:

receiving, at the second device, the stored request for service and the, retrieved associated data from the proxy device when the second device is on-line; and performing a service associated with the received request for service when the first device is off-line.

11. The method of claim 1, wherein the receiving step comprises the step of:

receiving the request for service from the first device via a high speed serial interface.

12. The method of claim 1, wherein the receiving step comprises the step of:

receiving the request for service from the first device via an IEEE 1394 interface.

13. The method of claim 1, wherein the receiving step comprises the step of:

receiving the request for service from the first device via a low speed serial interface.

14. The method of claim 1, wherein the retrieving step comprises the step of:

retrieving from the first device the data when the first device is on-line.

15. An apparatus for use in a multimedia network including a first device and a second device, said apparatus comprising:

a proxy program for receiving a first request for service from the first device via a serial interface, for storing the received first request for service in a queue, for retrieving, at the time of service, data associated with the stored first request for service from the first device when the second device requests the data and the first device provides the data, for sending to the second device a second request for service and the retrieved associated data when the second device is on-line, and receiving one or more results associated with a service performed by the second device based on the second request for service and the retrieved associated data, and for sending the received results to the first device when the first device is on-line; and a processor executing the proxy program.

16. The apparatus of claim 15, wherein the serial interface is a high speed serial interface.

17. The apparatus of claim 15, wherein the serial interface is an IEEE 1394 interface.

18. The apparatus of claim 15, wherein the serial interface is a low speed serial interface.

19. A system for use in a multimedia network including a proxy device, a first device, a second device, and a third device, said system comprising:

a requesting program for sending a request for service from the first device to the proxy device via a serial interface, for sending by the first device, at the time of service, data associated with the request to the proxy device when the first device provides the data and the proxy device requests the data, for sending by the second device, at the time of service, data associated with the request to the proxy device when the second device provides the data and the proxy device requests the data, for sending a second request for service and the retrieved associated data to the third device when the third device is on-line; and for receiving from the proxy device one or more results associated with a service performed by a third device based on the second request for service and the retrieved associated data; and a processor for executing the requesting program.

20. The system of claim 19, wherein the serial interface is a high speed serial interface.

21. The system of claim 19 wherein the serial interface is an IEEE 1394 interface.

22. The system of claim 19, wherein the serial interface is a low speed serial interface.

23. A computer-readable medium capable of configuring a computer to perform a method for performing services in a multimedia network including a first device, a second device, a third device, and a proxy device, said method comprising the steps of:

receiving, at the proxy device, a first request for service from the first device via a serial interface;

storing the received first request for service in a queue at the proxy device;

retrieving, at the time of service, data associated with the stored first request for service from the first device by the proxy device when the first device provides the data;

retrieving, at the time of service, data associated with the stored first request for service from the second device by the proxy device when the second device provides the data;

sending a second request for service and the retrieved associated data to the third device when the third device is on-line;

receiving one or more results associated with a service performed by the third device based on the second request for service and the retrieved associated data; and sending the results to the first device when the stored first request for service identifies the first device for receiving the results and the first device is on-line.

* * * * *

UNITED STATES PATENT AND TRADEMARK OFFICE
CERTIFICATE OF CORRECTION

PATENT NO. : 6,434,596 B1
DATED : August 13, 2002
INVENTOR(S) : Harold Aaron Ludtke and Michael W. Blasgen It is certified that error appears in the above-identified patent and that said Letters Patent is hereby corrected as shown below:

Column 5,
Line 12, "U.S. application Ser. No. 09/239,696, filed Jan. 29, 1999," should read
-- U.S. Application No. 09/239,696, filed January 29, 1999, --.

Column 7,
Line 62, "application Ser. No. 09/239,696, filed Jan. 29, 1999, entitled" should read
-- Application No. 09/239,696, filed January 29, 1999, entitled --.

Column 9,
Line 37, after "service and" delete "the,".

Column 10,
Line 35, after "claim 19" insert -- , --.

Signed and Sealed this

Twentieth Day of May, 2003

JAMES E. ROGAN
*Director of the United States Patent and Trademark Office*